United States Patent
Rhyoo et al.

(10) Patent No.: US 11,318,383 B2
(45) Date of Patent: May 3, 2022

(54) TERMINAL INCLUDING DISPLAYS AND GAME PROVISION METHOD THEREOF

(71) Applicant: Netmarble Corporation, Seoul (KR)

(72) Inventors: Jeong Yeon Rhyoo, Seoul (KR); Kyu Young Park, Seoul (KR); Jung Eun Lee, Seoul (KR)

(73) Assignee: Netmarble Corporation, Seoul (KR)

( * ) Notice: Subject to any disclaimer, the term of this patent is extended or adjusted under 35 U.S.C. 154(b) by 100 days.

(21) Appl. No.: 16/861,452

(22) Filed: Apr. 29, 2020

(65) Prior Publication Data

US 2020/0360809 A1 Nov. 19, 2020

(30) Foreign Application Priority Data

May 13, 2019 (KR) .................. 10-2019-0055369

(51) Int. Cl.
| | | |
|---|---|---|
| A63F 13/52 | (2014.01) | |
| G06F 3/04883 | (2022.01) | |
| G06F 3/14 | (2006.01) | |
| G06T 11/20 | (2006.01) | |
| A63F 13/42 | (2014.01) | |
| A63F 13/537 | (2014.01) | |

(52) U.S. Cl.
CPC .............. *A63F 13/52* (2014.09); *A63F 13/42* (2014.09); *A63F 13/537* (2014.09); *G06F 3/04883* (2013.01); *G06F 3/1423* (2013.01); *G06T 11/20* (2013.01); *A63F 2300/303* (2013.01); *A63F 2300/6045* (2013.01); *G06T 2200/24* (2013.01)

(58) Field of Classification Search
USPC ......................................... 463/31
See application file for complete search history.

(56) References Cited

U.S. PATENT DOCUMENTS

| | | | | |
|---|---|---|---|---|
| 8,517,829 | B2 * | 8/2013 | Reddy .................. | G07F 17/3211 463/31 |
| 8,926,427 | B2 * | 1/2015 | Asuke .................. | A63F 13/52 463/31 |
| 9,498,711 | B2 * | 11/2016 | Assa .................... | G06F 1/1626 |
| 2008/0039201 | A1 * | 2/2008 | Asuke .................. | A63F 13/52 463/44 |
| 2009/0176568 | A1 * | 7/2009 | Reddy .................. | G07F 17/3213 463/31 |

FOREIGN PATENT DOCUMENTS

| | | |
|---|---|---|
| JP | 2013097563 A | 5/2013 |
| KR | 20120098254 A | 9/2012 |
| KR | 20140091296 A | 7/2014 |
| KR | 20140135276 A | 11/2014 |
| KR | 20160001599 A | 1/2016 |
| KR | 20160018830 A | 2/2016 |
| KR | 20160020066 A | 2/2016 |

* cited by examiner

*Primary Examiner* — Pierre E Elisca
(74) *Attorney, Agent, or Firm* — Occhiuti & Rohlicek LLP

(57) ABSTRACT

A method of providing a game in a terminal including a plurality displays is provided. A first display may be set as a default display of a game, and a second display may be set as an input pad of the game. In response to a user input to the second display while game play is in progress through the first display, a result corresponding to the user input may be displayed on the first display.

15 Claims, 12 Drawing Sheets

FIG. 4

<First display>

TERMINAL INCLUDING DISPLAYS AND GAME PROVISION METHOD THEREOF

CROSS-REFERENCE TO RELATED APPLICATION(S)

This application claims the benefit of Korean Patent Application No. 10-2019-0055369, filed on May 13, 2019, in the Korean Intellectual Property Office, the disclosure of which is incorporated herein by reference.

BACKGROUND

1. Field of the Invention

The following example embodiments relate to a terminal including a plurality of displays and a game providing method thereof.

2. Description of the Related Art

Generally, a single-sided display is utilized for mobile game play.

As a related art, Korean Patent Laid-open Publication No. 10-2016-0001599, titled "Game terminal device", filed by Gungho Online Entertainment, Inc., discloses a terminal device. The terminal device includes a storage unit storing, in association with individual unit games, completion information indicating whether or not the unit game has been completed, an input unit acquiring operation information indicating specifics of an operation performed by a player, and a display controller for controlling displaying of a specific character in accordance with a first mode in which an action of the specific character is controlled on the basis of the operation information or a second mode in which the action of the specific character is controlled on the basis of the operation information at a frequency lower than that in the first mode, and the display controller enables utilization of the second mode on the basis of the completion information corresponding to a specific unit game during execution of the specific unit game.

SUMMARY

According to an aspect, there is provided a method of providing a game in a terminal with a plurality displays, the method including setting a first display as a default display of a game, setting a second display as an input pad of the game, and displaying, in response to a user input to the second display while game play is in progress through the first display, a result corresponding to the user input on the first display.

The displaying of the result on the first display may include displaying information about a state of a game character on the first display.

The displaying of the result on the first display may include displaying at least one of an inventory including information about an item possessed by a game character and a skill window including information about skills possessed by the game character on the first display.

The displaying of the result on the first display may include sensing a user input of dragging in a first direction on the second display after touching the second display, and rotating a viewpoint of a game character displayed on the first display based on the sensed user input.

The displaying of the result on the first display may include sensing a user rotation input by drawing a circle on the second display in a state of touching the second display, and replacing equipment of a game character based on the sensed user rotation input.

The replacing of the equipment may include replacing equipment worn by the game character with equipment corresponding to a position at which the user rotation input stops.

The displaying of the result on the first display may include identifying a shape of an object drawn by a user on the second display, and executing a function mapped to the identified shape and displaying a result of the executing on the first display.

The displaying of the result on the first display may include analyzing, in response to a plurality of touch events occurring on the second display, at least one of a number of the touch events and a region in which each of the touch events occurs, and executing a function based on a result of the analyzing and displaying a result of the executing on the first display.

A non-transitory computer-readable storage medium may store instructions that, when executed by a processor, cause the processor to perform the method.

According to another aspect, there is provided a terminal including a first display, a second display, and a controller configured to set the first display as a default display of a game, to set the second display as an input pad of the game and to display, in response to a user input to the second display while game play is in progress through the first display, a result corresponding to the user input on the first display.

The controller may be configured to display information about a state of a game character on the first display.

The controller may be configured to display at least one of an inventory including information about an item possessed by a game character and a skill window including information about skills possessed by the game character on the first display.

The controller may be configured to sense a user input of dragging in a first direction on the second display after touching the second display, and to rotate a viewpoint of a game character displayed on the first display based on the sensed user input.

The controller may be configured to sense a user rotation input by drawing a circle on the second display in a state of touching the second display, and to replace equipment of a game character based on the sensed user rotation input.

The controller may be configured to replace equipment worn by the game character with equipment corresponding to a position at which the user rotation input stops.

The controller may be configured to identify a shape of an object drawn by a user on the second display, to execute a function mapped to the identified shape and to display a result of the executing on the first display.

The controller may be configured to analyze, in response to a plurality of touch events occurring on the second display, at least one of a number of the touch events and a region in which each of the touch events occurs, to execute a function based on a result of the analyzing and to display a result of the executing on the first display.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIGS. 2 through 12 illustrate examples of an operation of a terminal according to an example embodiment;

DETAILED DESCRIPTION

Figure 1A:
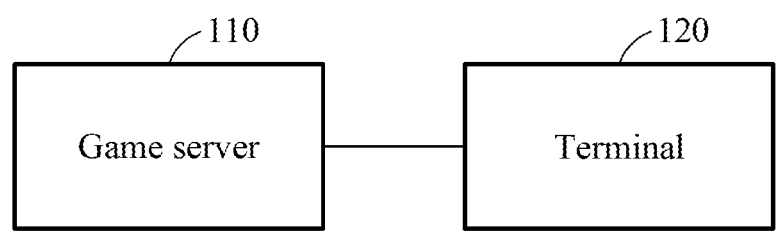
FIGS. 1A and 1B illustrate a game system according to an example embodiment.

Hereinafter, example embodiments will be described in detail with reference to the accompanying drawings. Various modifications may be made to the example embodiments. Here, the example embodiments are not construed as limited to the disclosure and should be understood to include all changes, equivalents, and replacements within the idea and the technical scope of the disclosure.

The terminology used herein is for the purpose of describing particular example embodiments only and is not to be limiting of the example embodiments. As used herein, the singular forms are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which example embodiments belong. Terms defined in dictionaries generally used should be construed to have meanings matching with contextual meanings in the related art and are not to be construed as an ideal or excessively formal meaning unless otherwise defined herein.

When describing the example embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

Also, the terms "first," "second," "A," "B," "(a)," "(b)," and the like may be used herein to describe components according to example embodiments. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

A component having a common function with a component included in one example embodiment is described using a like name in another example embodiment. Unless otherwise described, description made in one example embodiment may be applicable to another example embodiment and detailed description within a duplicate range is omitted.

Figure 1B:
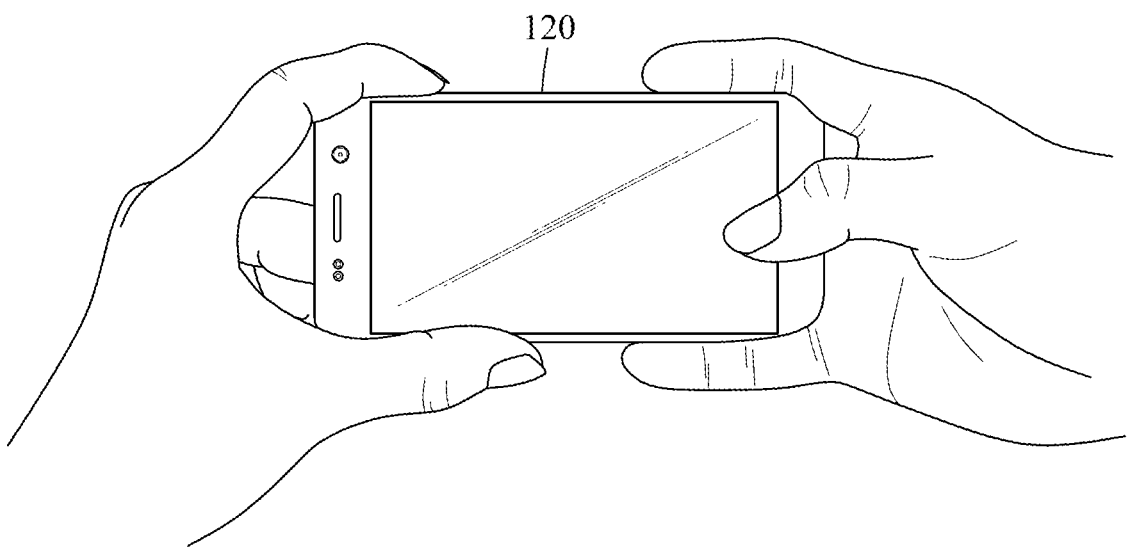

FIGS. 1A and 1B illustrate a game system according to an example embodiment.

Referring to FIG. 1A, a game system 100 includes a game server 110 and a terminal 120.

In FIG. 1A, the terminal 120 may access the game server 110. The terminal 120 may be a mobile terminal, and may correspond to, but is not limited to, for example, a smartphone, or a tablet personal computer (PC). The terminal 120 may be differently expressed as an electronic apparatus or an electronic device.

Although a single terminal, for example, the terminal 120, is shown in FIG. 1A, the game system 100 may include a plurality of terminals. In other words, the plurality of terminals may access the game server 110.

The terminal 120 may include a plurality of displays and may allow a game user to play a game using the plurality of displays. For example, as shown in FIG. 1B, a game user may hold the terminal 120 including a double-sided display with both hands to play a game. In this example, a first display of the double-sided display at which the game user looks may correspond to a default display, and a second display corresponding to the other display of the double-sided display may be used as an input pad. Also, the default display may refer to a display on which game play (for example, combat) is in progress, or a display on which at least one game element (for example, a game character) is display. In response to a user input to the second display while the game play is in progress through the first display, a result corresponding to the user input may be displayed on the first display.

In an example, the game user may touch the second display with both hands and sweep or drag outward. When the above input of the game user is sensed, the terminal 120 may display at least one of an inventory window and a skill window on the first display. The example will be further described below with reference to FIGS. 2 through 4.

In another example, the game user may touch a point on the second display and may sweep or drag the touched point in a specific direction. When the above input of the game user is sensed, the terminal 120 may change a viewpoint or a viewing angle of a game character. The example will be further described below with reference to FIGS. 5 through 7.

In still another example, the game user may apply a rotation input by drawing a circle as if a jog dial is turned after touching the second screen during game play. In this example, the terminal 120 may replace equipment of a game character. The example will be further described below with reference to FIGS. 8 through 10.

In yet another example, the game user may input a touch of a predetermined pattern to the second display. In this example, the terminal 120 may allow a game character to perform an operation corresponding to the input touch. The example will be further described below with reference to FIGS. 11 and 12.

Thus, the terminal 120 may allow the game user to more easily play the game. In other words, a game terminal 230 of FIG. 2 may enhance ease of game play of the game user.

Hereinafter, examples of an operation of the terminal 120 will be further described with reference to FIGS. 2 through 12.

FIGS. 2 through 12 illustrate examples of the operation of the terminal 120 according to an example embodiment.

Figure 2:
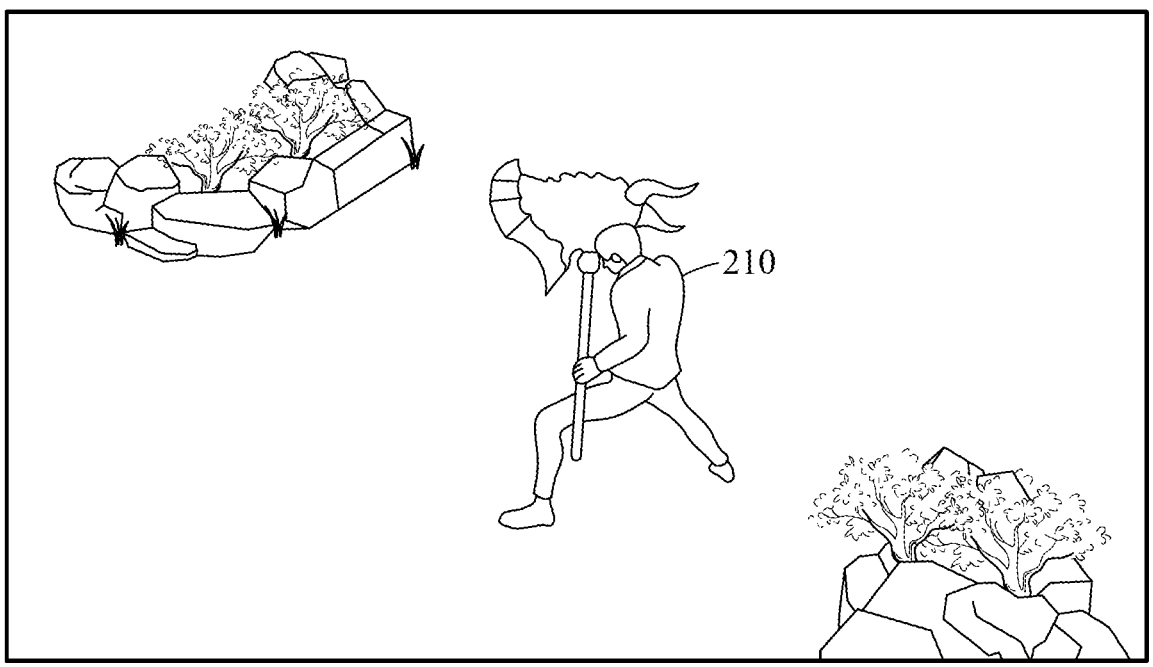

According to an example embodiment, in an example of FIG. 2, a game character 210 is displayed on the first display of the terminal 120. In this example, a game user may apply an input to the second display, and the terminal 120 may display an inventory including information about an item possessed by the game character 210 on the first display based on the input.

Figure 3A:
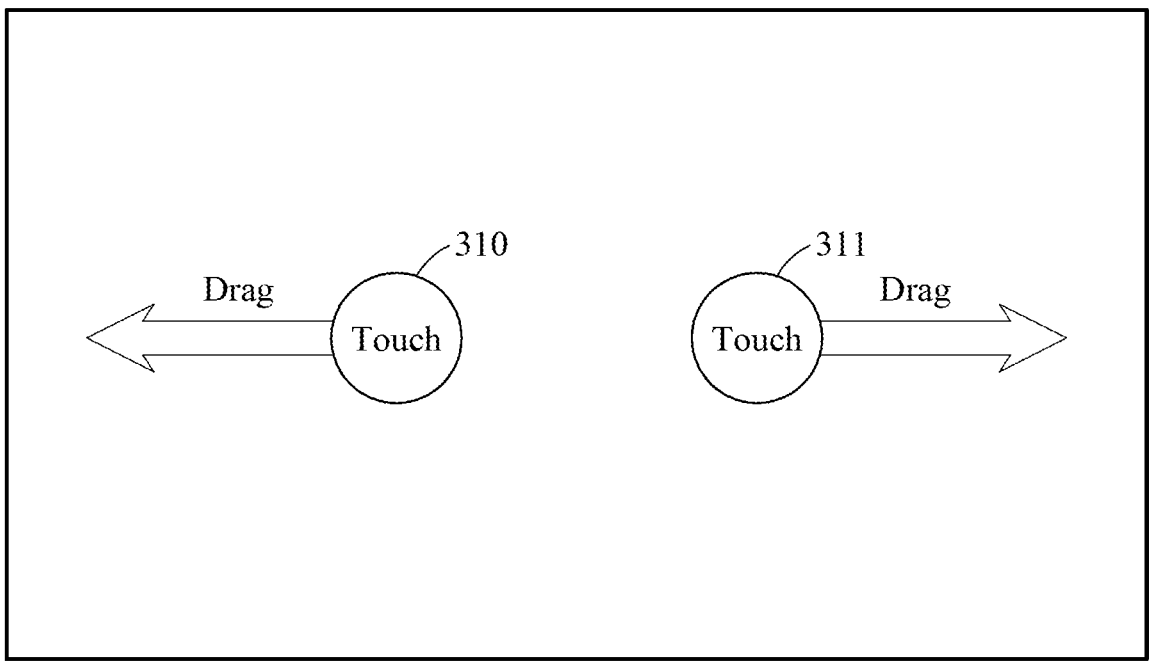

For example, the game user may apply touch inputs 310 and 311 to the second display as shown in FIG. 3A in a state of holding the terminal 120 with both hands as shown in FIG. 1B, and may drag outward in a state of applying the touch inputs 310 and 311. Depending on an implementation, as shown in FIG. 3B, the game user may apply touch inputs 320 through 341 to the second display and may drag outward in a state of applying the touch inputs 320 through 341.

Figure 3B:
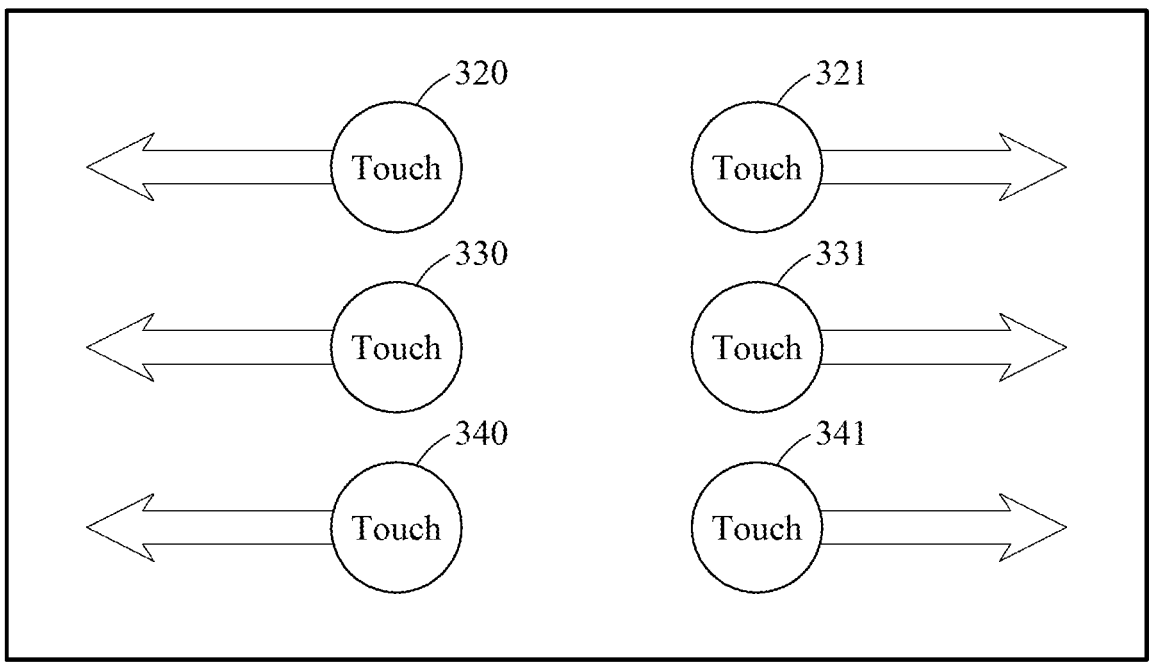
Figure 4:
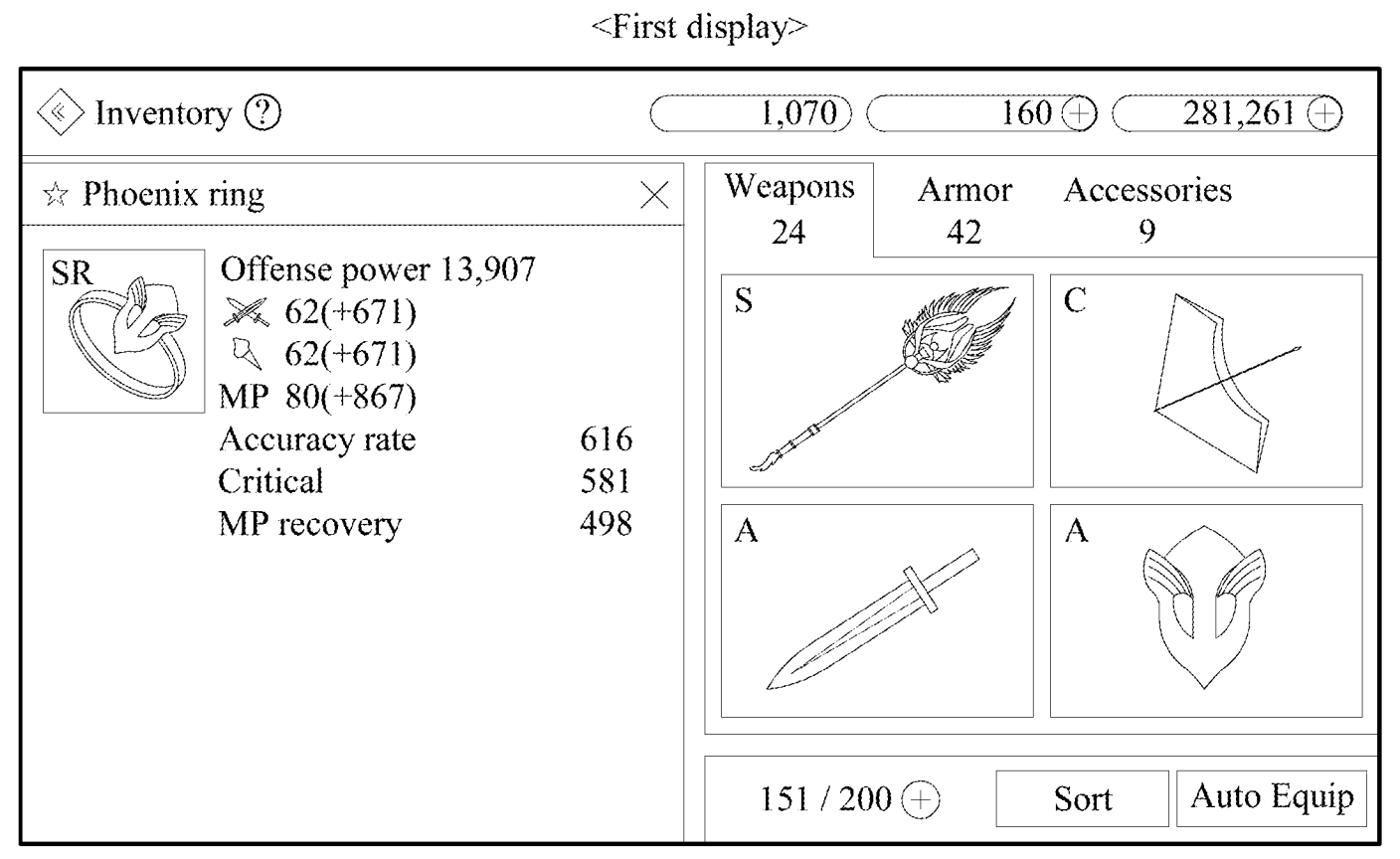

When an operation of the game user described with reference to FIG. 3A or 3B is sensed, the terminal 120 may display an inventory on the first display. For example, when an input of dragging outward after a touch input to the second display is sensed, the terminal 120 may display an inventory on the first display, as shown in FIG. 4. Depending on an implementation, when an operation of the game user described with reference to FIG. 3A or 3B is sensed, the terminal 120 may display a skill window including information about skills possessed by the game character 210 on the first display.

Figure 5:
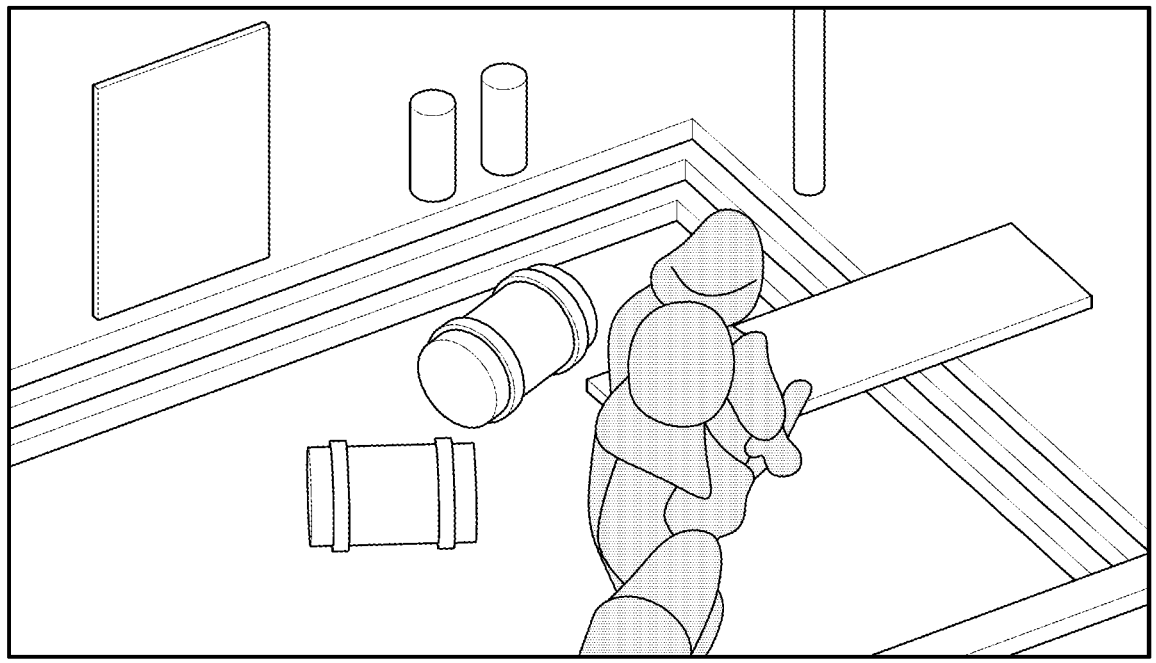
Figure 5:
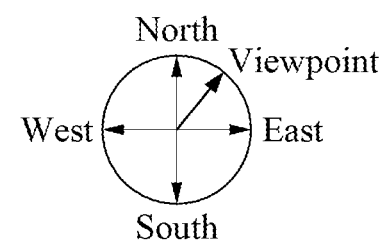

According to an example embodiment, in an example of FIG. 5, a game character 510 is display on the first display of the terminal 120. In this example, the game character 510 may be looking northeast. In other words, a viewpoint or a viewing angle of the game character 510 may correspond to the northeast.

The game user may apply a user input to the second display. For example, as shown in FIG. 6, the game user may apply a touch input 610 to the second display and may drag leftward in a state in which the touch input 610 is applied.

Figure 6:
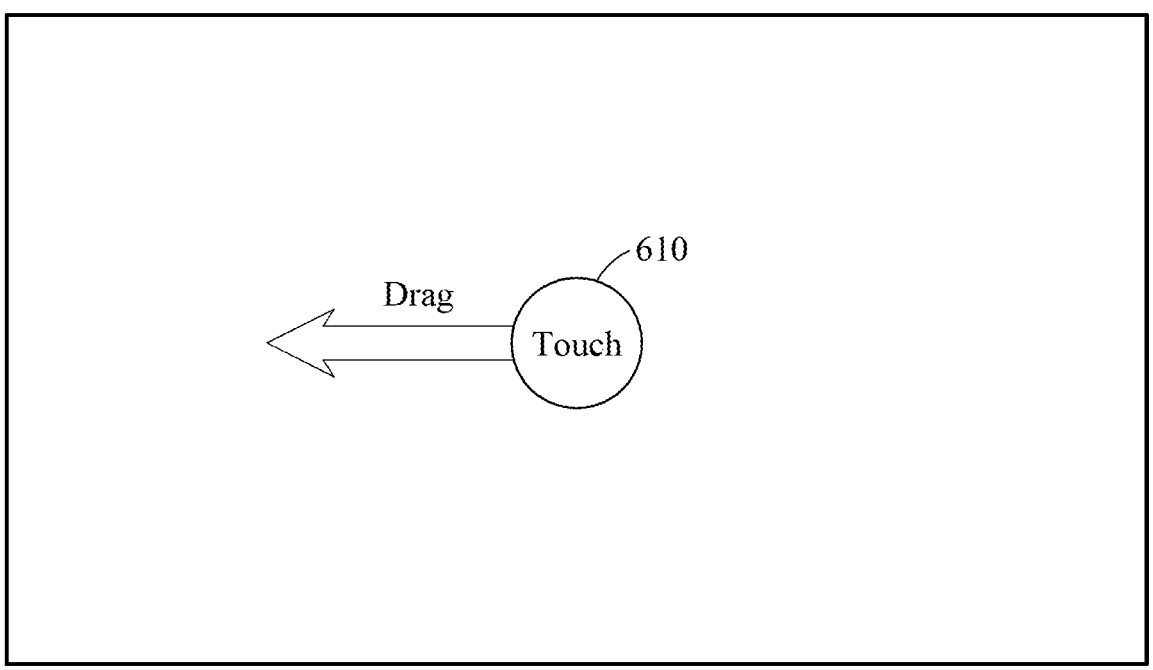
Figure 7:
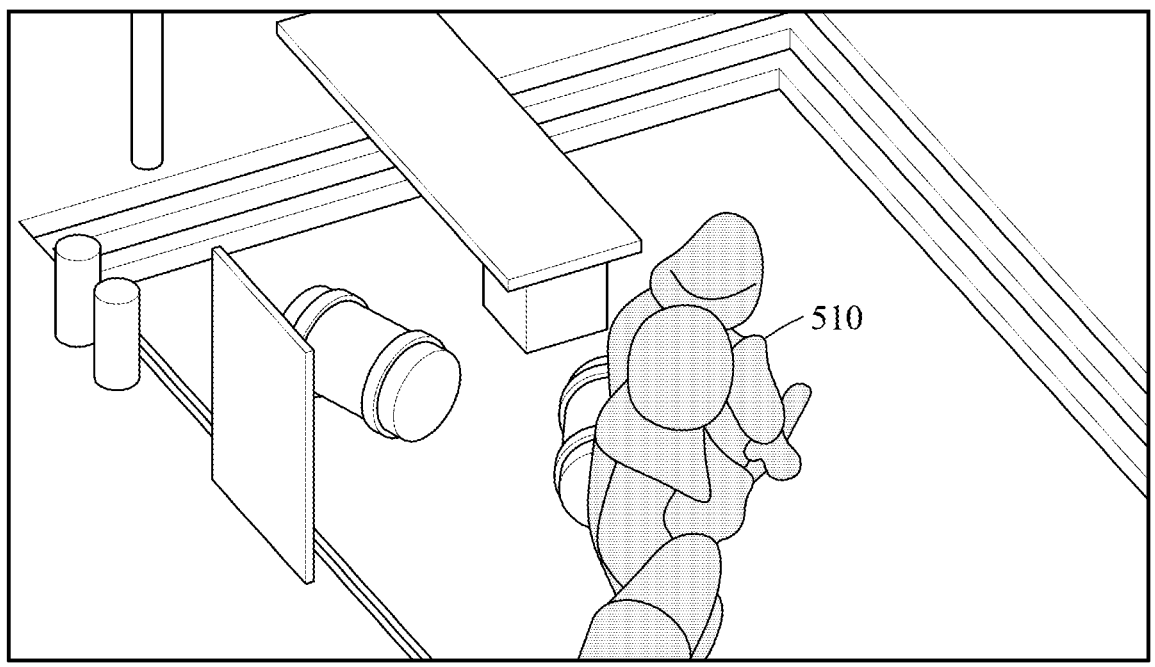
Figure 7:
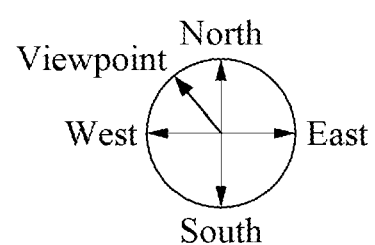

When the above game user input described with reference to FIG. 6 is sensed, the terminal 120 may rotate the viewpoint or the viewing angle of the game character 510 based on a drag direction on the second display. As shown in FIG. 7, the terminal 120 may rotate the viewpoint or the viewing angle of the game character 510 such that the game character 510 may face the northeast direction. For example, when a leftward drag input is applied to the second display after the touch input on the second display, the terminal 120 may rotate a view of the game character 510 in a counterclockwise direction by an angle corresponding to a length of the leftward drag input. In the example of FIG. 6, when the length of the leftward drag input increases, the viewpoint of the game character 510 may rotate in the counterclockwise direction. Similarly, in the example of FIG. 6, when a rightward drag input is applied to the second display after the touch input on the second display, the terminal 120 may rotate the view of the game character 510 in a clockwise direction by an angle corresponding to a length of the rightward drag input.

Figure 8:
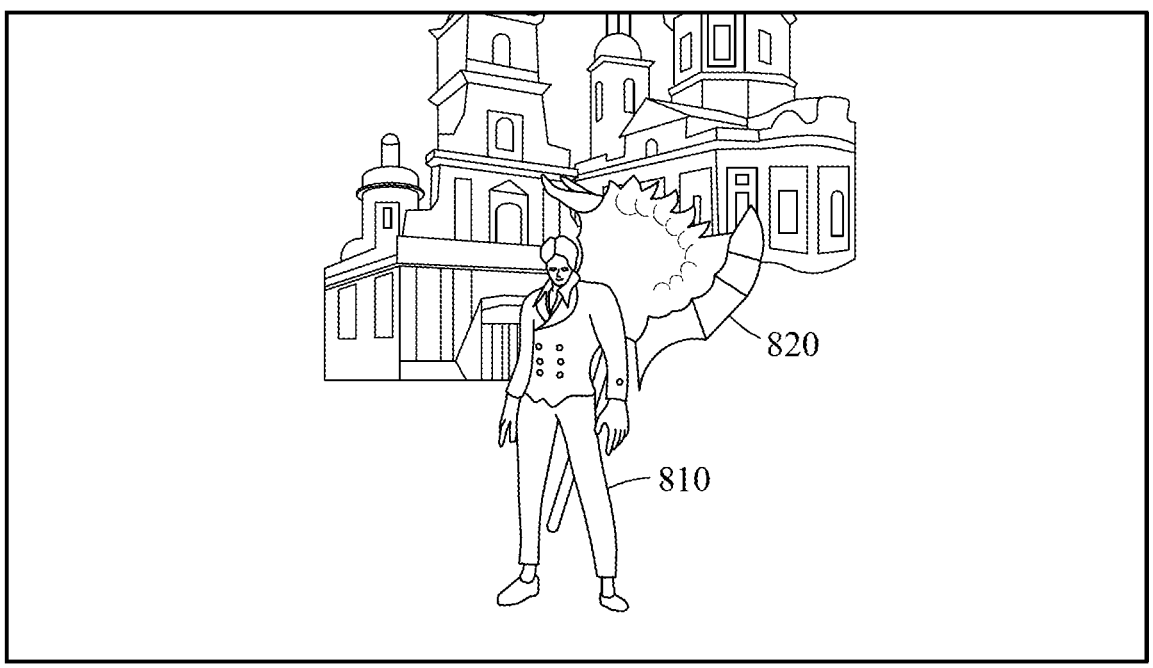

According to an example embodiment, in an example of FIG. 8, a game character 810 is displayed on the first display of the terminal 120. The game character 810 is equipped with equipment 820.

Figure 9:
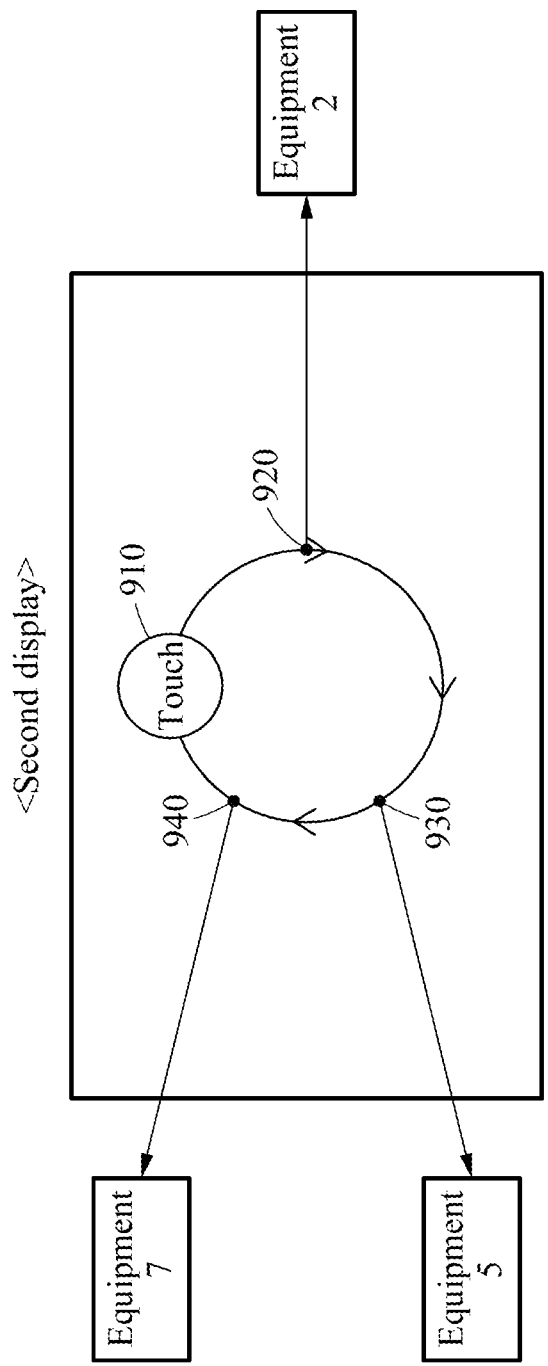
Figure 10:
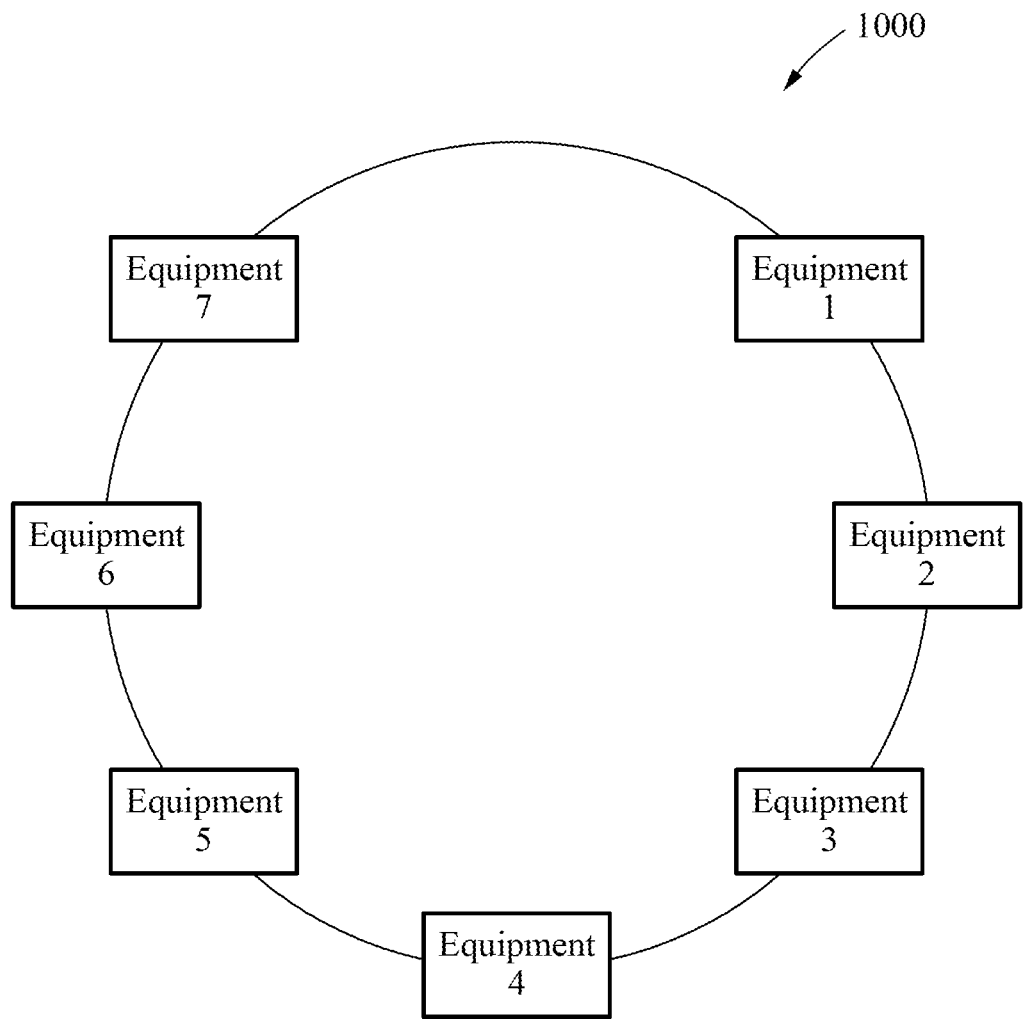

A game user may apply a user input to the second display during game play. For example, as shown in FIG. 9, the game user may apply a rotation input by drawing a circle in a state of applying a touch input to the second display. In other words, the game user may drag in the clockwise direction in a state of touching the second display. In this example, the equipment 820 of the game character 810 may be sequentially replaced with another equipment. In an example of FIG. 9, when the game user drags to a position 920 in the clockwise direction and stops dragging or when a touch disappears at the position 920, the terminal 120 may replace the equipment 820 with equipment 2 based on setting information 1000 of FIG. 10 that is provided in advance. The replacing of the equipment 820 with the equipment 2 may be visually displayed on the first display. In this example, when the game user drags to a position 930 by passing the position 920 and stops dragging or when a touch disappears at the position 930, the terminal 120 may replace the equipment 820 with equipment 5 based on the setting information 1000 that is provided in advance. The replacing of the equipment 820 with the equipment 5 may be visually displayed on the first display. When the game user drags to a position 940 by passing the positions 920 and 930 and stops dragging or when a touch disappears at the position 940, the terminal 120 may replace the equipment 820 with equipment 7 based on the setting information 1000 that is provided in advance. The replacing of the equipment 820 with the equipment 7 may be visually displayed on the first display.

Depending on an implementation, the description provided with reference to FIG. 9 is applicable to an example in which the game user applies a counterclockwise rotation input. In an example, when the game user applies an input of dragging and rotation in the counterclockwise direction after a touch input 910, when the input stops at the position 940, or when a touch disappears at the position 940, the terminal 120 may replace the equipment 820 with the equipment 7. In another example, when the game user applies an input of dragging and rotation in the counterclockwise direction after the touch input 910, when the input stops at the position 930, or when a touch disappears at the position 930, the terminal 120 may replace the equipment 820 with the equipment 5. In another example, when the game user applies an input of dragging and rotation in the counterclockwise direction after the touch input 910, when the input stops at the position 920, or when a touch disappears at the position 920, the terminal 120 may replace the equipment 820 with the equipment 2.

According to an example embodiment, a game user may play a game through the first display and may input a preset direction command to the second display during the game play. In an example, the game user may draw an object with a specific shape by dragging on the second display while playing the game through the first display. In this example, the object may correspond to a direction command that is set in advance by the game user or the terminal 120.

Figure 11:
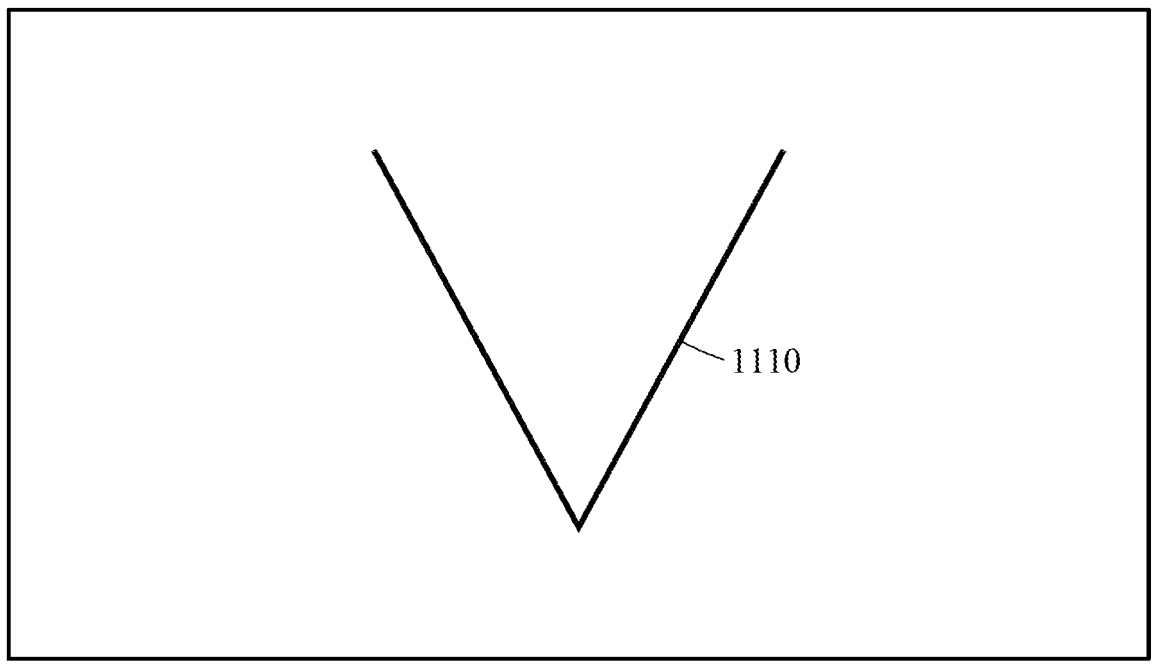

The terminal 120 may identify the shape of the object drawn on the second display, may execute a function corresponding to the identified shape and may display an execution result on the first display. For example, "V" is assumed as a direction command to execute a function that a game character returns to a village in a game. When the game user draws "V" 1110 through a touch input as shown in FIG. 11 while playing the game through the first display, the terminal 120 may allow the game character to return to the village in the game. In this example, returning of the game character to the village may be visually displayed on the first display.

According to a related art, there is an inconvenience of needing to search for an icon and call a function during game play on the first display. However, the terminal 120 may easily call a function through the second display instead of interrupting the game play on the first display.

Figure 12:
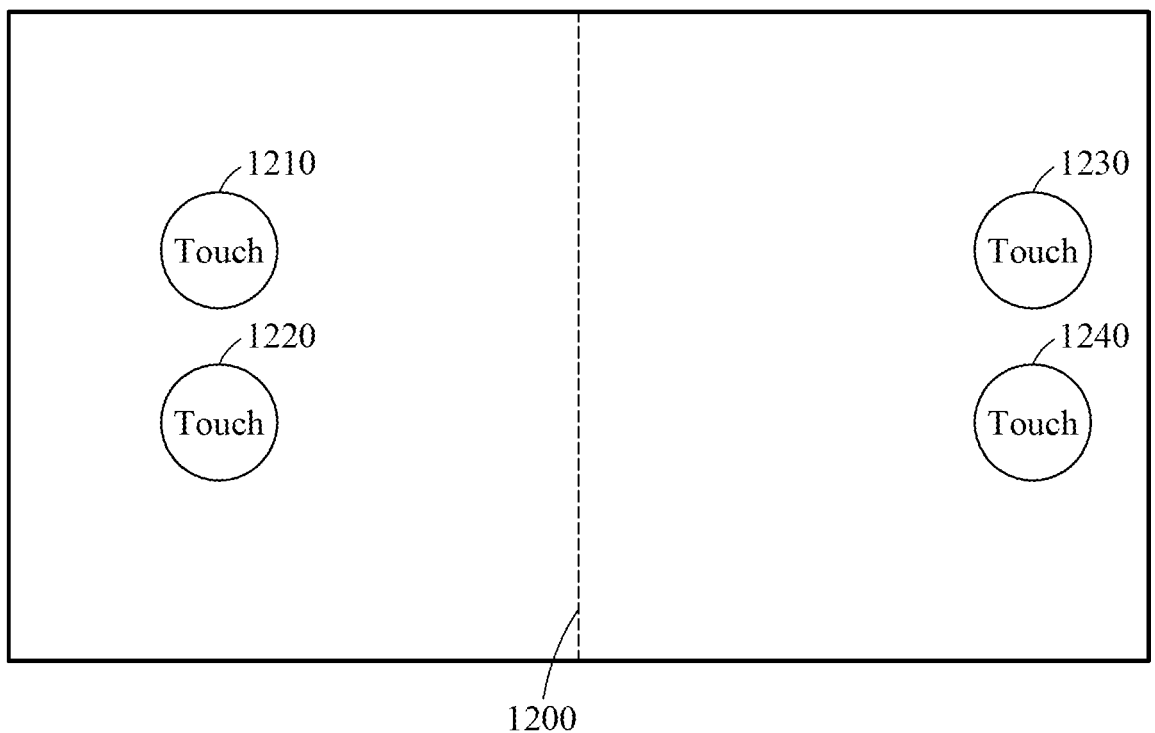

According to an example embodiment, different operations may be represented on the first display based on a number of fingers of a game user touching the second display and/or positions of the fingers. For example, FIG. 12 shows two touch inputs 1210 and 1220 on a left region of the second display and two touch inputs 1230 and 1240 on a right region of the second display based on a baseline 1200. When the above multi-touch event occurs, the terminal 120 may execute a function corresponding to the multi-touch event and display an execution result on the first display. For example, the touch inputs 1210 through 1240 of FIG. 12 are assumed to be set in advance to correspond to stop of game play. In this example, when the touch inputs 1210 through 1240 are sensed while a game user is playing a game through the first display, the terminal 120 may stop the game play. In another example, when one of the touch inputs 1210 and 1220 is sensed and the touch inputs 1230 and 1240 are sensed while the game user is playing the game through the first display, the terminal 120 may allow a game character to use a specific skill.

Figure 13:
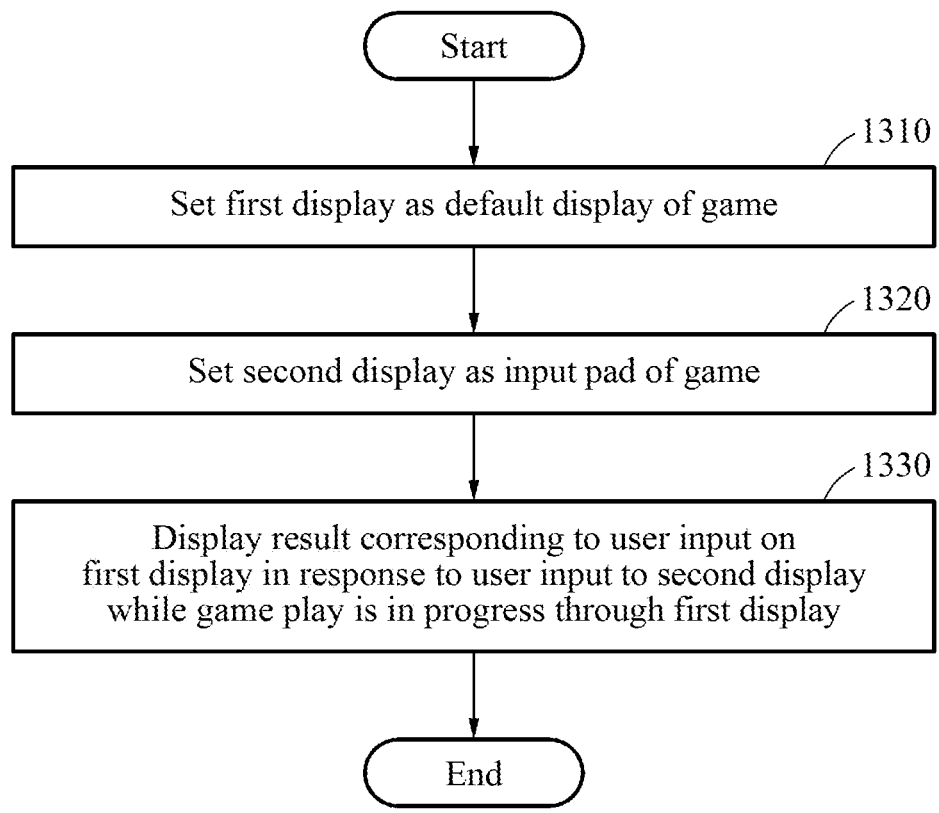
FIG. 13 is a flowchart illustrating a method of providing a game in a terminal according to an example embodiment.

FIG. 13 is a flowchart illustrating a method of providing a game in a terminal according to an example embodiment.

Referring to FIG. 13, in operation 1310, the terminal 120 sets a first display as a default display of a game. For example, the terminal 120 may set a display on one side of a double-sided display, which is frequently used by a user, as a default display. Depending on an implementation, a user may select one of displays in the double-sided display to use the selected display as a default display of a game, and the terminal 120 may set the selected display as a default display.

In operation 1320, the terminal 120 sets a second display as an input pad of the game. For example, the terminal 120 may set a display on the other side of the double-sided display, which is not set as a default display, as an input pad.

In operation 1330, in response to a user input to the second display while game play is in progress through the first display, the terminal 120 displays a result corresponding to the user input on the first display.

In an example, in response to a user input to the second display while game play is in progress through the first display, the terminal 120 may display at least one of information about a state (for example, experience points left for level-up, or physical strength information) of a game character, an inventory including information about an item possessed by a game character, and a skill window including information about skills possessed by a game character, on the first display.

In another example, after a user touch input to the second display, the terminal 120 may sense a user input of dragging in a first direction on the second display and may rotate a view of a game character displayed on the first display based on the sensed user input. Thus, the game user may easily verify surroundings or a state of the game character. The example has been described above with reference to FIGS. 5 through 7, and accordingly further description thereof is not repeated herein.

In still another example, the terminal 120 may sense a user rotation input by drawing a circle on the second display in a state of touching the second display, and may replace equipment of a game character based on the sensed user rotation input. In this example, equipment worn by the game character may be replaced with equipment corresponding to a position at which the user rotation input stops. The example has been described above with reference to FIGS. 8 through 10, and accordingly further description thereof is not repeated herein.

In yet another example, the terminal 120 may identify a shape of an object drawn by a user on the second display, may execute a function mapped to the identified shape and may display an execution result on the first display. The example has been described above with reference to FIG. 11, and accordingly further description thereof is not repeated herein.

In a further example, when a plurality of touch events occur on the second display, the terminal 120 may analyze at least one of a number of the touch events and a region in which each of the touch events occurs, may execute a function based on an analysis result and may display an execution result on the first display. The example has been described above with reference to FIG. 12, and accordingly further description thereof is not repeated herein.

The description provided with reference to FIGS. 1A through 12 is applicable to the method of FIG. 13, and accordingly further description thereof is not repeated herein.

Figure 14:
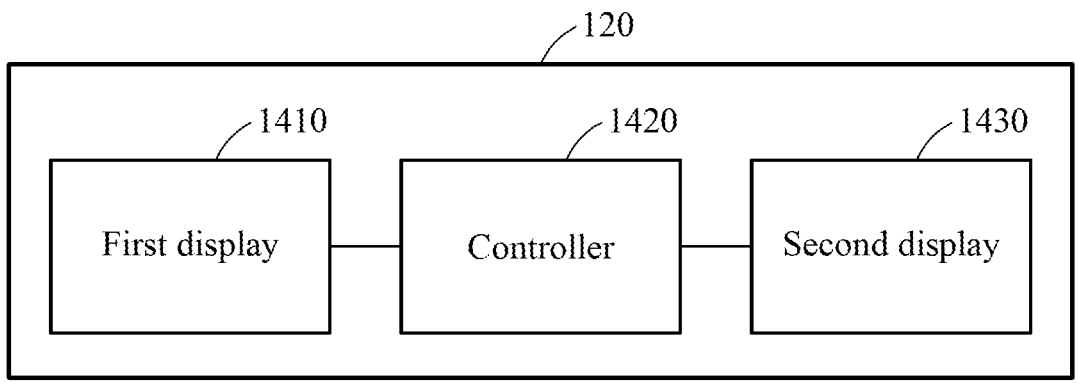
FIG. 14 is a block diagram illustrating a terminal according to an example embodiment.

FIG. 14 is a block diagram illustrating a terminal according to an example embodiment.

Referring to FIG. 14, the terminal 120 may include a first display 1410, a controller 1420, and a second display 1430.

Each of the first display 1410 and the second display 1430 may correspond to a touch display.

The controller 1420 may set the first display 1410 as a default display of a game and set the second display 1430 as an input pad of the game.

In response to a user input to the second display 1430 while game play is in progress through the first display 1410, the controller 1420 may display a result corresponding to the user input on the first display 1410.

In example embodiments, the first display 1410 and the second display 1430 may be implemented as a double-sided display, but are not limited thereto.

The controller 1420 may be implemented as a processor or an application processor.

Although not shown in FIG. 14, the terminal 120 may further include a memory.

The memory may include, for example, a non-transitory computer-readable medium known in the art including, for example, a volatile memory such as a static random access memory (SRAM) and a dynamic random access memory (DRAM), and/or a non-volatile memory such as a read-only memory (ROM), an erasable programmable ROM, flash memories, hard disks, optical disks and magnetic tapes.

The memory stores software, for example, game software. When software is executed by the controller 1420, the operations of the terminal 120 described above with reference to FIGS. 1A through 13 may be implemented.

The controller 1420 may display a game element on a display (for example, the first display 1410) at which a game user is looking, or a display (for example, the first display 1410) that is set as a default display by the game user. The game element may be a graphical element constituting a game or a graphical element displayed on a display during game play, and may include, for example, a game character of a game user. For example, when the game user is playing a game through the first display 140, the game user may apply a user input to the terminal 120. In this example, the user input may include, for example, at least one of an action of turning the terminal 120 over, a touch input to the second display 1430 of the terminal 120, and a touch input of an activation button of the second display 1430 exposed on the first display 1410. The terminal 120 may sense the user input and may display a game element (for example, a game map, or a game character of a participant) on the second display 1430 of the terminal 120. Depending on an implementation, when a specific event occurs in a game, the terminal 120 may activate the second display 1430. The specific event may include, for example, an event in which a vitality of a game character of a game user falls below a predetermined percentage, an event in which a vitality of a game character of a member participating in a game of the game user falls below a predetermined percentage, an event in which the member participating in the game is attacked in the game, or an event in which a number of recovery items in an inventory of the game user is zero.

In an example, when the game user turns the terminal 120 over to move to a "village" while playing a game (for example, a quest or combat) using the first display 1410, the controller 1420 may activate the second display 1430, and may output a state in which a character is moved to the "village" in the game to the second display 1430. The game user may continue to play the game in the "village" through the second display 1430.

In another example, when the game user turns the terminal 120 over to move to a "village" while playing a game (for example, a quest or combat) using the first display 1410, the controller 1420 may activate the second display 1430, and may output a state in which a character is moved to the "village" in the game to the second display 1430. In this example, the controller 1420 may automatically store a state of the game played in the first display 1410. The game user may continue to play the game in the "village" through the second display 1430. Due to a game activity in the "village", a game state may change. When the game user turns the terminal 120 over again to look at the first display 1410, the controller 1420 may display the stored state on the first display 1410. In this example, the game state changed due to the game activity in the village may be reflected.

In still another example, when the game user turns the terminal 120 over while playing a game (for example, a party battle, a guild war, or a siege war) with other game users using the first display 1410, the controller 1420 may activate the second display 1430, and may output a game play situation (for example, a combat situation) of a game user satisfying a predetermined condition among the other game users to the second display 1430. In this example, the controller 1420 may continue to display a game play situation (for example, a combat situation) of the game user on the first display 1410.

In yet another example, when the game user turns the terminal 120 over while playing a game using the first display 1410, the controller 1420 may display a map or a place set by the game user on the second display 1430. In this example, the game user may turn the terminal 120 over again and continue to play the game through the first display 1410.

In a further example, when the game user turns the terminal 120 over while playing a game using the first display 1410, the controller 1420 may display one or at least two of an inventory, a state and a skill window of the game user on the second display 1430.

In a further example, when the game user turns the terminal 120 over while playing a game using the first display 1410, the controller 1420 may display a situation of a back side of a game character of the game user on the second display 1430. In other words, the controller 1420 may display a situation or a field of view in which the game character "looks back" on the second display 1430.

In a further example, when the game user configures a "party" in a game, the controller 1420 may designate one user among members of the party as an "observer" based on a selection of the game user. In this example, the "observer" may perform a reconnaissance function while moving from one place to another in the game. When a second display of a game terminal of each of the members other than the "observer" is activated, a reconnaissance screen of the "observer" may be displayed on the second display.

Thus, the terminal 120 may allow the game user to more easily play a game. In other words, the terminal 120 may enhance ease of game play of the game user.

The description provided with reference to FIGS. 1A through 13 is applicable to the terminal 120 of FIG. 14, and accordingly further description thereof is not repeated herein.

The method according to the above-described example embodiments may be recorded in non-transitory computer-readable media including program instructions to implement various operations which may be performed by a computer. The media may also include, alone or in combination with the program instructions, data files, data structures, and the like. The program instructions recorded on the media may be those specially designed and constructed for the purposes of the example embodiments, or they may be of the well-known kind and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter. The described hardware devices may be configured to act as one or more software modules in order to perform the operations of the above-described example embodiments, or vice versa.

Software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of providing a game in a terminal with a plurality of display devices, the method comprising:

Setting, by a processor a first display device as a default display of a game;

Setting, by the processor a second display device as an input pad of the game; and displaying, in response to a user input to the second display device while game play is in progress through the first display device, a result corresponding to the user input on the first display device, wherein the displaying of the result on the first display device comprises:

analyzing, in response to a plurality of touch events occuring on the second display device, at least one of a number of the touch events and a region in which each of the touch events occurs; and executing a function based on a result of the analyzing and displaying a result of the executing on the first display device.

2. The method of claim 1, wherein displaying the result on the first display device comprises displaying information about a state of a game character on the first display device.

3. The method of claim 1, wherein displaying the result on the first display device comprises displaying at least one of: an inventory including information about an item possessed by a game character and a skill window including information about skills possessed by the game character on the first display device.

4. The method of claim 1, wherein displaying the result on the first display device comprises sensing a user input of dragging in a first direction on the second display device after touching the second display device and rotating a viewpoint of a game character displayed on the first display device based on the sensed user input.

5. The method of claim 1, wherein displaying the result on the first display device comprises sensing a user rotation input by drawing a circle on the second display device in a state of touching the second display device and replacing equipment of a game character based on the sensed user rotation input.

6. The method of claim 5, wherein the replacing of the equipment comprises replacing equipment worn by the game character with equipment corresponding to a position at which the user rotation input stops.

7. The method of claim 1, wherein displaying the result on the first display device comprises identifying a shape of an object drawn by a user on the second display device; executing a function mapped to the identified shape and displaying a result of the executing on the first display device.

8. A non-transitory computer-readable storage medium storing instructions that, when executed by a processor, cause the processor to perform the method of claim 1.

9. A terminal comprising:

a first display;

a second display; and a controller configured to set the first display as a default display of a game, to set the second display as an input pad of the game and to display, in response to a user input to the second display while game play is in progress through the first display, a result corresponding to the user input on the first display, wherein the controller is configured to anaylze, in response to a plurality of touch events occuring on the second display, at least one of: a number of the touch events and a region in which each of the touch events occurs, to execute a function based on a result of the analyzing, and to display a result of the executing on the first display.

10. The terminal of claim 9, wherein the controller is configured to display information about a state of a game character on the first display.

11. The terminal of claim 9, wherein the controller is configured to display at least one of: an inventory including information about an item possessed by a game character and a skill window including information about skills possessed by the game character on the first display.

12. The terminal of claim 9, wherein the controller is configured to sense a user input of dragging in a first direction on the second display after touching the second display and to rotate a viewpoint of a game character displayed on the first display based on the sensed user input.

13. The terminal of claim 9, wherein the controller is configured to sense a user rotation input by drawing a circle on the second display in a state of touching the second display and to replace equipment of a game character based on the sensed user rotation input.

14. The terminal of claim 13, wherein the controller is configured to replace equipment worn by the game character with equipment corresponding to a position at which the user rotation input stops.

15. The terminal of claim 9, wherein the controller is configured to identify a shape of an object drawn by a user on the second display, to execute a function mapped to the identified shape and to display a result of the executing on the first display.

* * * * *